United States Patent [19]

Johnson et al.

[11] Patent Number: 5,209,287
[45] Date of Patent: May 11, 1993

[54] FCC CATALYST COOLER

[75] Inventors: Daniel R. Johnson, Schaumburg; Kevin J. Brandner, Elgin, both of Ill.

[73] Assignee: UOP, Des Plaines, Ill.

[21] Appl. No.: 893,289

[22] Filed: Jun. 4, 1992

[51] Int. Cl.⁵ .............................. F28C 3/16
[52] U.S. Cl. .................... 165/104.18; 165/104.16; 502/44; 502/41; 422/144
[58] Field of Search .............. 165/104.16, 104.18; 502/41, 44; 422/144, 146

[56] References Cited

U.S. PATENT DOCUMENTS 5,000,841  3/1991  Owen ............................. 502/44
5,027,893  7/1991  Cetinbaya et al. ........... 165/104.18

Primary Examiner—Albert W. Davis, Jr.
Attorney, Agent, or Firm—Thomas K. McBride; John G. Tolomei

[57] ABSTRACT

A catalyst cooler arrangement for an FCC regenerator improves the operation of the cooler by the use of a full or partial screen arrangement at the cooler outlet of the regenerator to remove material that interferes with the operation of the cooler and especially the distribution of fluidizing gas within the cooler.

8 Claims, 7 Drawing Sheets

FCC CATALYST COOLER

FIELD OF THE INVENTION

This invention relates generally to the fluidized catalytic cracking of hydrocarbons. More specifically this invention relates to external catalyst coolers for the cooling of catalyst in FCC regenerators.

BACKGROUND OF THE INVENTION

The fluid catalyst cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Coke-contaminated catalyst enters the regenerator and is contacted with an oxygen containing gas at conditions such that the coke is oxidized and a considerable amount of heat is released. A portion of this heat escapes the regenerator with the flue gas, comprised of excess regeneration gas and the gaseous products of coke oxidation. The balance of the heat leaves the regenerator with the regenerated, or relatively coke free, catalyst. The high heat evolved in the regeneration process creates high temperatures in the regenerator. In order to withstand the high temperatures the large regeneration vessel has an internal concrete-like refractory lining that insulates the metal shell from the high regenerator temperatures and erosion of the abrasive catalyst.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. The most common method of regulating the reaction temperature is by regulating the rate of circulation of catalyst from the regeneration zone to the reaction zone which simultaneously increases the catalyst/oil ratio. That is to say, if it is desired to increase the conversion rate, an increase in the rate of flow of circulating fluid catalyst from the regenerator to the reactor is effected. Inasmuch as the temperature within the regeneration zone under normal operations is considerably higher than the temperature within the reaction zone, this increase in influx of catalyst from the hotter regeneration zone to the cooler reaction zone effects an increase in reaction zone temperature.

An increasing number of FCC units use an external catalyst cooler to provide additional flexibility in operation. The term external catalyst cooler generally refers to a shell and tube heat exchanger that circulates catalyst from the regenerator on the shell side of the exchanger and saturated steam or water on the tube side of the exchanger. Indirect heat exchange with the steam or water cools the catalyst that circulates through the cooler and provides a source of relatively lower temperature catalyst for recirculation to the regenerator or return to the FCC reaction zone. By lowering the temperature of the catalyst, independent of the coke combustion, the cooler allows the FCC unit to fully combust coke without excessive temperatures when processing heavier feedstocks that produce more coke or to control the catalyst circulation rate independent of the riser temperature.

Locating the heat exchanger tubes outside of the regenerator in an external cooler permits isolation from a majority of the catalyst inventory in the event of a tube rupture or other operational problems. The external location of the cooler relative to the regenerator requires a circulation of catalyst between the cooler and the regenerator. Normally the circulating catalyst enters or exits the cooler from the a large open volume of the regenerator. Air nozzles or aeration piping keep the catalyst in a fluidized state so that it can circulate through the cooler. The cooler can operate in a flow through mode where hot catalyst enters one end of the cooler and leaves through from an opposite end of the cooler or in a backmix mode where the catalyst enters and leaves through the opening without any net flow. Aeration is particularly important in the backmix mode where a high degree of turbulence is needed to obtain the necessary interchange of catalyst through the cooler.

In some cases the aeration air has caused failure of the catalyst coolers by the rupture of the heat exchange tubes. It has now been found that the passage or accumulation of debris in the catalyst cooler led to the failure of the heat exchange tubes. Along with the fine particles of FCC catalyst that flow through an FCC unit, a small amount of debris also moves through the FCC unit. This debris normally consists of pieces of spalled or broken refractory lining from the inside of the vessel or agglomerated masses of the fine catalyst particles. This debris seldom causes any problem in most FCC units, but passes downwardly through the vessels and piping and accumulates in inactive areas of the unit for removal during normal maintenance. However, it was discovered that when such debris enters the catalyst cooler it can disrupt the airflow from the aeration nozzles or air distribution pipes. Surprisingly this disruption of air flow from accumulated debris has been found to cause tube failures at locations remote from the debris and the aeration nozzle outlets.

BRIEF DESCRIPTION OF THE INVENTION

Accordingly this invention is a screen arrangement for an FCC catalyst cooler that will restrict the entry of debris that has been found to be one source of tube wall failures. The screen arrangement of this invention is located at the inlet of the cooler and has an arrangement that does not interfere with the free flow of catalyst and aeration air through the cooler. A variety of screen arrangements can be used in accordance with this to maintain a free flow of catalyst through a variety of cooler inlet openings.

In its most general form this arrangement improves an FCC regenerator having a catalyst cooler comprising a shell and tube heat exchanger located external to an FCC regenerator vessel, a regenerator outlet opening defined by the wall of the regenerator vessel for transferring catalyst from the regenerator to the catalyst cooler, a cooler inlet opening defined by the shell of the cooler for receiving catalyst from the regenerator outlet opening, means for contacting catalyst in the cooler with a fluidizing gas, and a fluidizing gas outlet opening defined by the means for contacting and located below the cooler inlet opening. The arrangement is improved by providing means for screening objects having any dimension greater than at least ½ inch that is fixed about the regenerator outlet opening and has an arrangement that diverts screened objects away from the means for screening without blocking catalyst flow into the regenerator outlet opening.

External coolers have a variety of locations on the regenerator vessel. Regardless of location good cooler operation requires an unobstructed flow of catalyst into and out of the cooler. The arrangement of this invention can be used in most external cooler arrangement without interfering with the flow of catalyst into the cooler. Since it has been found that only relatively large objects will interfere with the passage of fluidizing gas into the cooler, the screen material can provide large openings that offer minimal occlusion of the opening to catalyst flow. Moreover, particular orientations of the regenerator outlet opening will permit reduced screen usage. Differing cooler locations will dictate the orientation of the regenerator outlet opening. When the plane of the opening is inclined to the vertical, the screen material will usually cover the entire opening. However, when the plane of the regenerator outlet opening lies in a principally horizontal or vertical plane, a section of screen material that only partially covers the opening will block large objects from entering the cooler.

DETAILED DESCRIPTION OF THE INVENTION

Figure 1:
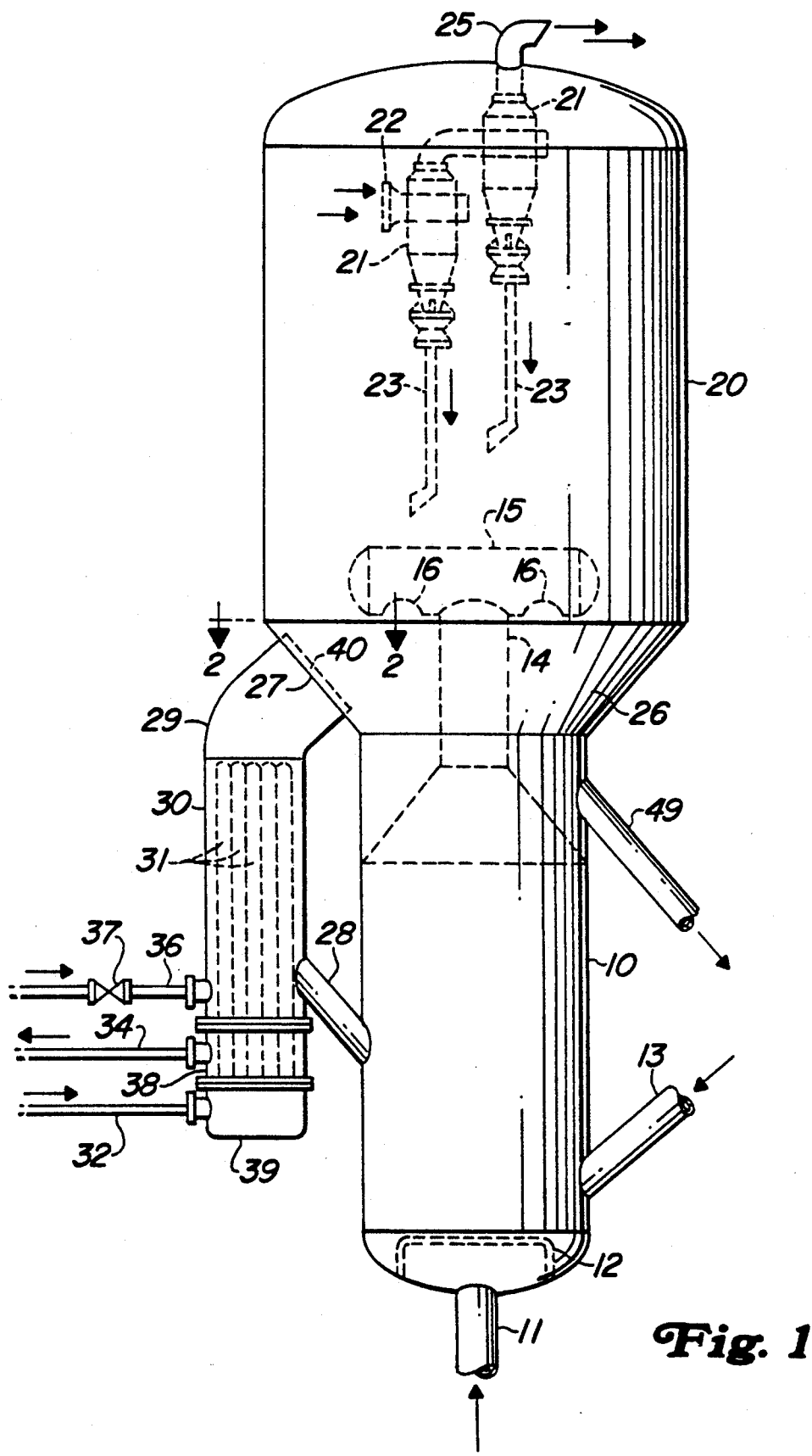
FIG. 1 shows an FCC regenerator with an external catalyst cooler and an inclined regenerator outlet opening.

This invention can be applied to any FCC unit that uses an external catalyst cooler and distributes fluidizing gas to the cooler at a location below the inlet by which catalyst enters the cooler. FIG. 1 depicts a typical FCC regenerator having a combustor 10, an upper disengaging vessel 20, and frusto conical section 26 between lower section 10 and upper section 20 and a catalyst cooler 30 supported from cone 26. In operation the regenerator contacts spent catalyst transferred from a reactor vessel (not shown) by a conduit 13 with compressed air from a conduit 11 and a distributor 12. Contact with oxygen combusts coke from the surface of the catalyst as it passes upwardly through vessel 10 and internal riser 14. A disengager 15 directs the catalyst and gas mixture thru outlets 16 into the disengager vessel 20. Catalyst collects in and below cone 26 as it disengages from the combustion gases. A small portion of the catalyst remains entrained with the combustion gases and enters inlet 22 of cyclones 21 which separate essentially all of the entrained catalyst from the combustion gases. Dip pipes 23 return catalyst from the cyclones to the cone section 26 while conduit 25 removes combustion gases from the process. A conduit 49 removes a portion of the catalyst that collects in cone section and returns to the FCC reactor for the continued operation of the process.

Another portion of the catalyst from cone section 26 passes through a regenerator outlet opening 27 and into an inlet opening of catalyst cooler 30 defined by conduit 29. Catalyst entering the cooler 30 contacts the outer surface of heat exchange tubes 31 as it passes downwardly through the cooler and returns to the combustor 10 via a conduit 28. Heat exchange tubes 31 are a bayonet style tube having an outer tube that contacts the catalyst and an inner tube for circulating a cooling fluid. Boiler feed water comprises the typical cooling fluid which enters a manifold 39 via a conduit 32. Manifold 39 distributes cooling fluid to the inner tubes of the bayonet tubes 31 and manifold 38 collects the cooling fluid from the annular space between the inner and outer tubes of bayonet tube 31 for recovery via a line 34.

Fluidizing gas comprising air and distributed by a plurality of conduits enters cooler 30 via a conduit 36 at a rate regulated by a control valve 37. Fluidizing gas passes upwardly through the cooler and thru outlet 27 into disengaging vessel 20. The outlets for the fluidizing gas that enters via line 36 are located below the inlet for cooler. Any debris that accumulates in the upper regeneration vessel can enter thru the outlet 27 and interfere with the distribution of fluidizing gas in the cooler as the debris passes downwardly and collect in the cooler below the inlet for conduit 28.

Figure 2:
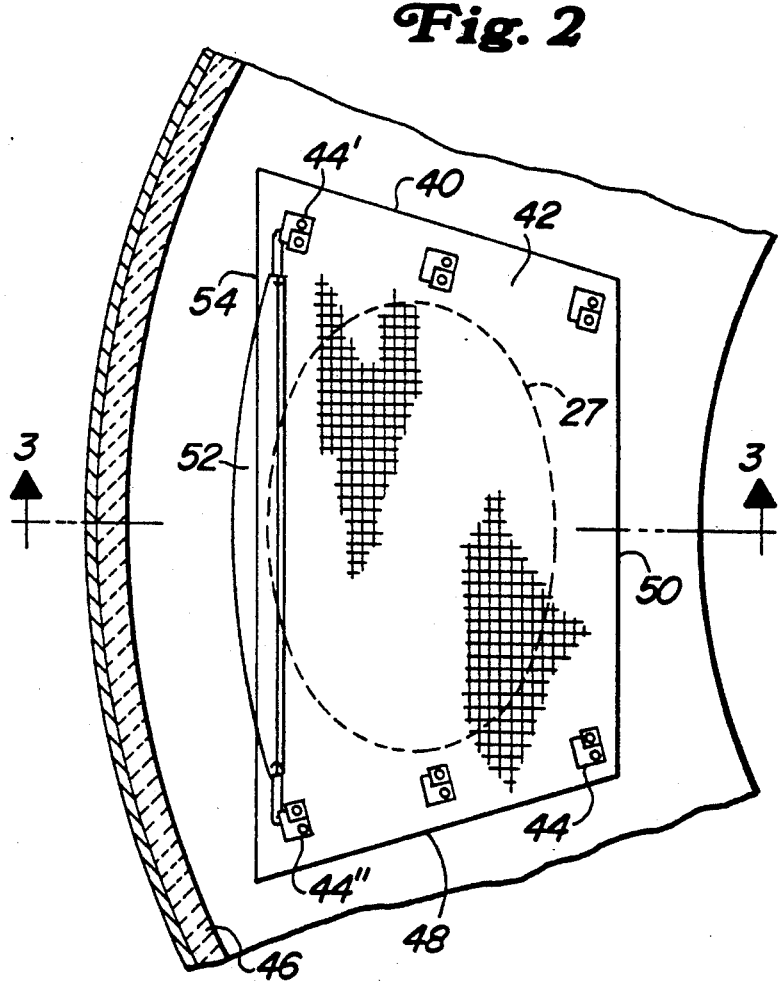
FIG. 2 is a section of FIG. 1 taken along line 2—2.

To prevent the entry of large objects such as agglomerated masses of catalyst and loose pieces of refractory lining from entering the cooler a sheet of screen material 40 covers opening 27. Since the cooler is located in the cone section 26, the plane of opening 27 is inclined with respect to the vertical axis. Due to the inclined plane of opening 27 the screen section 40 covers the entire opening 27. Covering the entire opening prevents debris from entering any part of the opening. The extent of the screen with respect to the opening is shown in FIG. 2 wherein a sheet of screen material 42 extends past the periphery of opening 27 on all sides. A plurality of support plates 44 hold the screen 42 above the refractory lining 46 that covers the section of cone 26. The side edges 48 and the bottom edge 50 the screen section are normally place between two to six inches above the refractory lining. A plate beam 52 attached at opposite ends to support plates 44' and 44" spans the upper side 54 of the screen section 42 and typically extends downwardly to within two inches or less of the refractory lining to prevent any debris from sliding down the wall of the cone into opening 27. Plate beam 52 also provides support for the upper potion of the screen section.

Figure 3:
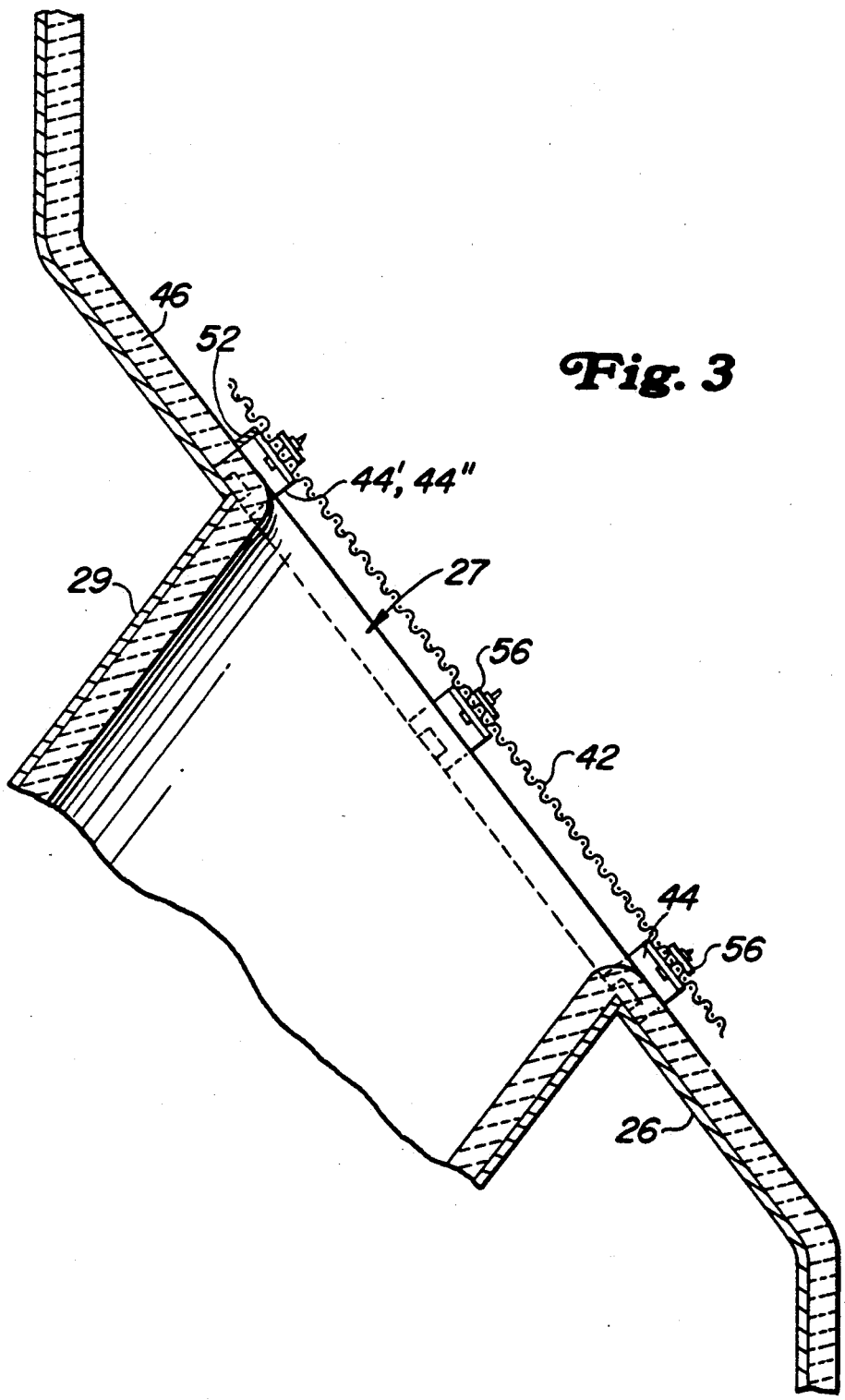
FIG. 3 is a section of FIG. 1 taken along line 3—3.

FIG. 3 depicts the angle of the screen and the attachment of screen 42 to support plates 44. As debris moves contacts the screen over opening 27 the angle of the screen sheds any debris from the surface of the screen.

Plate beam 52 prevents debris from sliding down from above the screen 42 and entering opening 27.

The screen material can comprise any material that will reject debris but offer little or no interference with the movement of catalyst into or out of the opening 27. It has been found that only debris that is relatively large in comparison to the catalyst needs to be excluded from the regenerator outlet opening. The screen opening should be sized to exclude debris that has a dimension of at least ½ inch and is preferably sized to exclude debris having a dimension of at least 1 inch. Preferably the screen is composed of stainless steel bar material having a diameter of about ¼ inch arranged perpendicularly on 1.5 inch centers. The screen material should have the same percentage of open flow areas as the percentage of catalyst flow area across the tube section of the catalyst cooler. (The catalyst flow area is the area between the heat exchange tubes in the cooler.)

Any method can be used to secure the screen about the opening 27. A hold down plate 56 bolted to support plate 44 secures the screen to the support plates. Preferably the screen 42 is fixed about the opening 27 in a manner that permits removal for inspection and maintenance.

Figure 4:
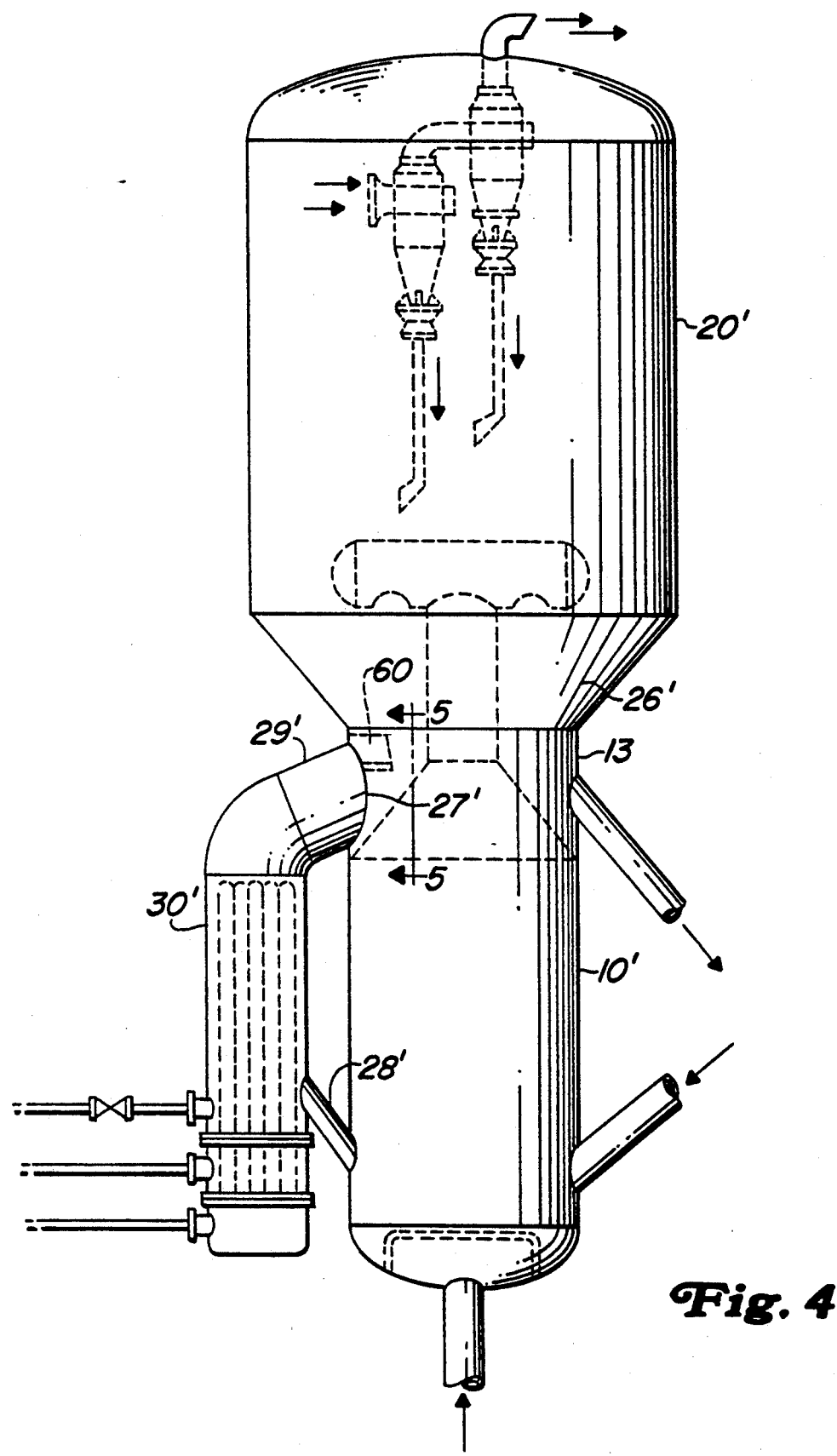
FIG. 4 shows an FCC regenerator with an external catalyst cooler and a vertically oriented regenerator outlet opening.

FIG. 4 shows an alternate arrangement for the screen of this invention wherein a catalyst inlet opening 27' lies in a vertical plane. The regeneration vessel depicted in FIG. 4 includes a combustor 10', a disengager vessel 20' and a catalyst cooler 30' and operates in essentially the same manner as that of the vessel described in conjunction with FIG. 1. In FIG. 4 catalyst cooler 30' has an inlet opening defined by a conduit 29' that communicates a regenerator inlet opening 27' which is defined by an upper section 13 of combustor 10' and a conduit 28' that returns catalyst to the combustor. The vertical orientation of outlet 27 permits use of a screen section 60 that extends inwardly from the wall of combustor section 13. This screen section will typically extend inwardly by a distance equal to about ⅓ the diameter of catalyst cooler 30'.

Figure 5:
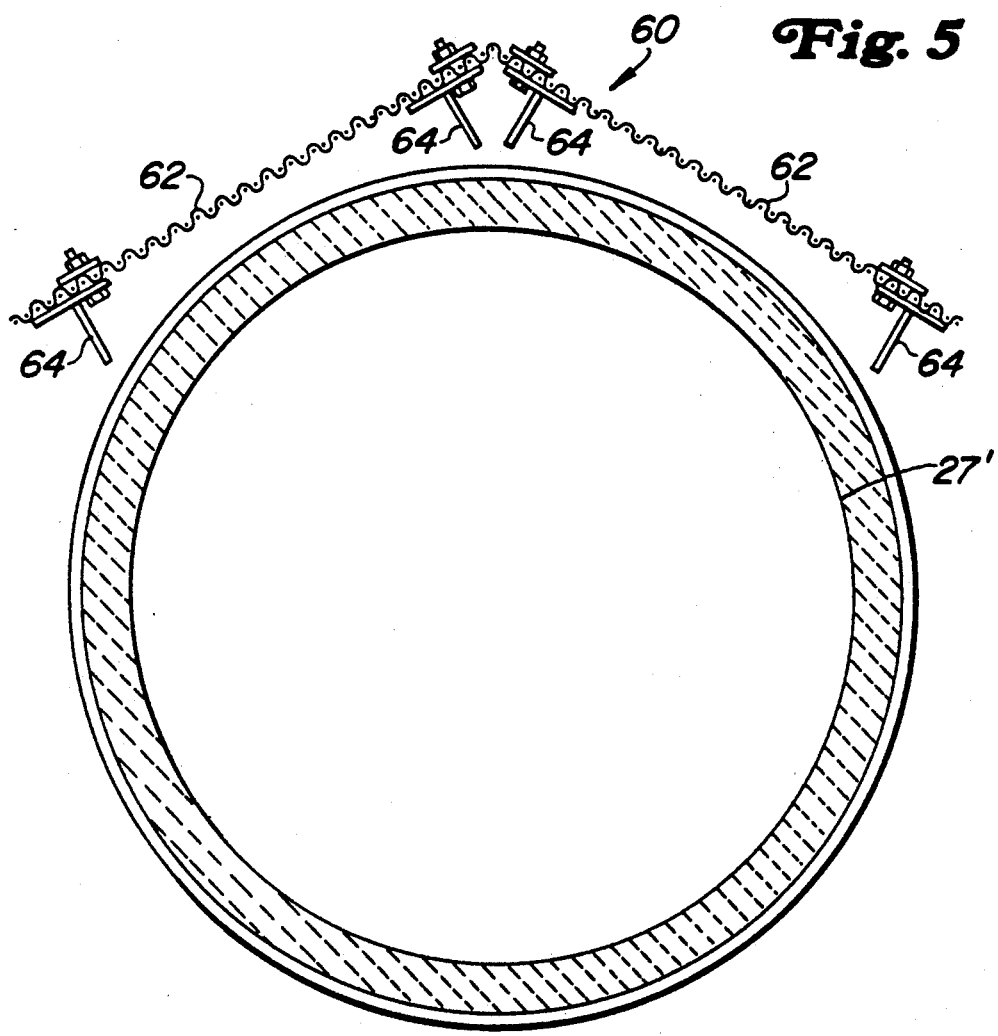
FIG. 5 is a section of FIG. 4 taken along line 5—5.

FIG. 5 shows a elevation view for the arrangement of the screen of FIG. 4. The arrangement uses two sheets of screen material 62 that slant downwardly on both sides of the vertical centerline of opening 27'. The lower ends of sheets 62 extend past the sides of opening 27' and are secured to the wall of combustor section 13 by horizontally extended support plates 64. The downwardly sloping arrangement of screens 62 sheds debris that would otherwise accumulate on the top of screens 62. A screen arrangement as shown in FIGS. 4 and 5 provide a completely open outlet without any screen material to interfere with catalyst flow or inspection of the cooler.

Figure 6:
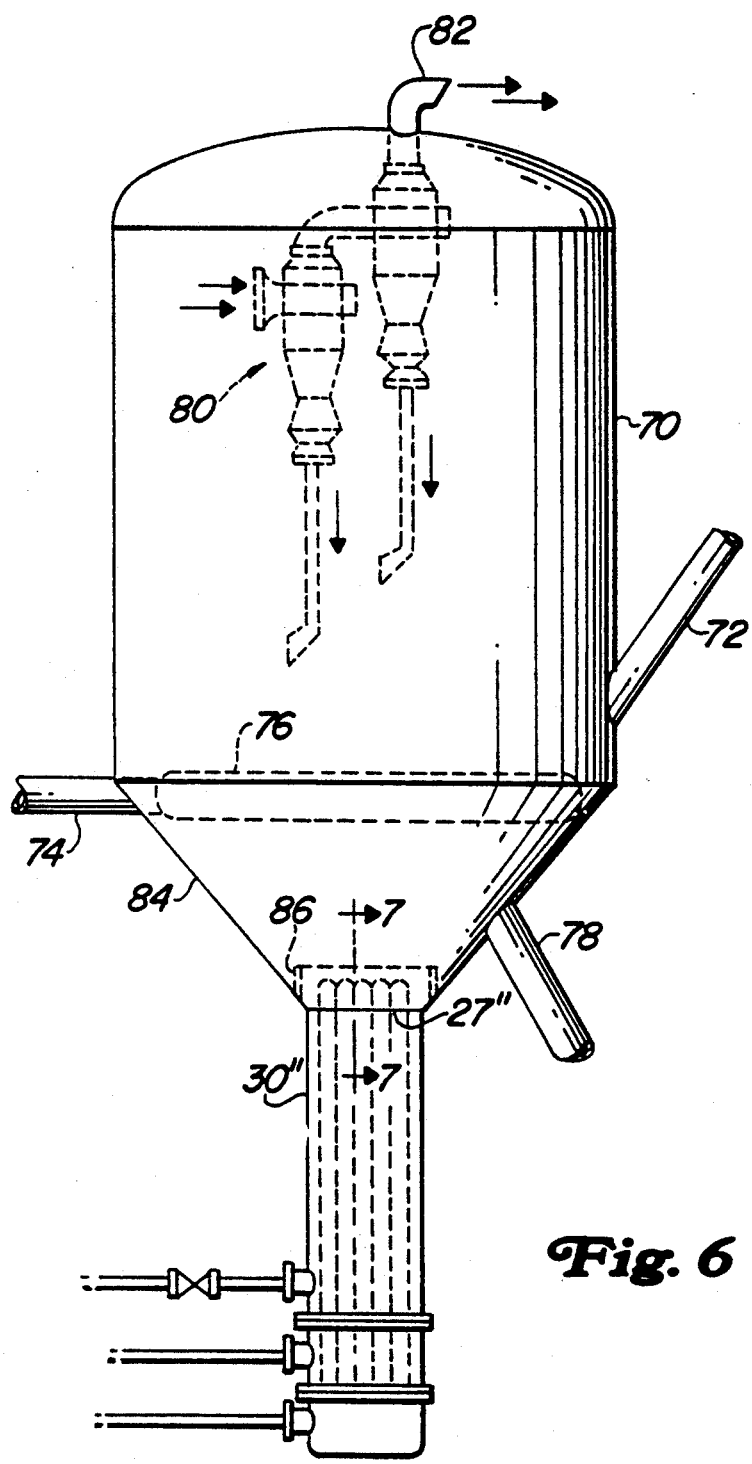
FIG. 6 shows an FCC regenerator with an external catalyst cooler and a horizontally oriented regenerator outlet opening.

FIG. 6 depicts another type of FCC regenerator that uses a single regeneration vessel 70 and backmix type catalyst cooler 30". The regeneration vessel 70 receives spent catalyst from a conduit 72. Compressed air, passed to the regeneration vessel via a conduit 74 and distributor 76, contacts the spent catalyst and combusts coke from the catalyst to provide regenerated catalyst. A conduit 78 returns regenerated catalyst to the reaction zone while a cyclone system 80 separates entrained catalyst from combustion gases that leave the regeneration zone thru a conduit 82. Catalyst cooler 30" receives catalyst from a lower conical section 84 through a regenerator outlet opening 27'''. Cooler 30" operates in the essentially manner as the previously described catalyst coolers except that there is no separate outlet for cooled catalyst and outlet 27''' serves as an outlet for catalyst from the cooler as well such that catalyst circulates in and out of the opening to the cooler in a manner generally referred to as a backmix operation. In such an operation circulation of catalyst through the cooler is controlled solely by the addition of fluidizing gas to the cooler.

Figure 7:
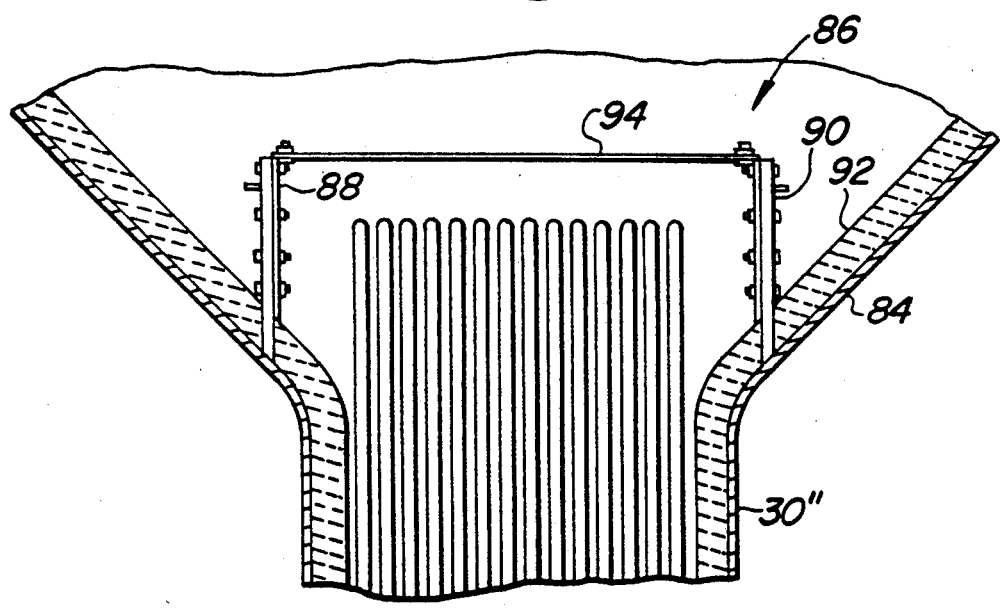
FIG. 7 is a section of FIG. 6 taken along line 7—7.

A screen arrangement 86 located about the inlet to catalyst cooler 30" prevents debris from entering the cooler. FIG. 7 shows the screen arrangement in more detail. A cylindrical band of screen material is supported by a series of regularly spaced support bars 90 that extend upwardly from cone 84 through refractory lining 92. Bolts or other fastening means can be used to secure the screen material to the support brackets. The screen material is essentially the same as that previously described. The cylindrical bottom of the cylindrical band of screen material is located within at least two inches of refractory lining 92 and extend upwardly for a vertical distance that is preferably equal to at least ⅓ the diameter of cooler 30".

In its simplest form the screen arrangement 86 will include only the cylindrical band of screen material and will not have a cover include screen material over the top of the opening to cooler 30". Most debris that can enter the cooler will slide down the wall of cone 84 and enter the side of the cooler opening. Therefore, the cylindrical band is adequate to prevent most debris from the cooler opening in the arrangement of FIGS. 6 and 7 such that the top can be left open for an unobstructed exchange of catalyst and inspection. However, where there is the potential for debris to enter the top of the cooler, an additional section of screen 94 can be placed over the top of the cooler opening and secured to the sides of the cylindrical screen section. Preferably the screen section 94 will extend at least to the periphery of the ring of screen material 88 that borders the cooler opening.

We claim:

1. In an FCC regenerator having a catalyst cooler comprising a shell and tube heat exchanger located external to an FCC regenerator vessel, a regenerator outlet opening defined by the wall of the regenerator vessel for transferring catalyst from the regenerator to the catalyst cooler, a cooler inlet opening defined by the shell of the cooler for receiving catalyst from the regenerator outlet opening, means for contacting catalyst in said cooler with a fluidizing gas, and a fluidizing gas outlet opening defined by said means for contacting and located below said cooler inlet opening, the improvement wherein means for screening objects having any dimension greater than at least ½ inch is fixed about the regenerator outlet opening and said means for screening has an arrangement that diverts screened objects away from said means for screening without blocking catalyst flow into said regenerator outlet opening.

2. The improvement of claim 1 wherein said means for screening includes a wire screen having a pitch that does not exceed 1.5 inches.

3. The improvement of claim 1 wherein the plane of said regenerator outlet opening is inclined with respect to a vertical plane and the said means for screening includes screen material that covers the entire flow area of said regenerator outlet opening.

4. The improvement of claim 1 wherein the plane of said regenerator outlet opening is vertical and said means for screening includes a sheet of screen material fixed above the regenerator outlet opening and extending inwardly from the vessel wall in a horizontal direction for a distance equal to at least one third of the cooler diameter.

5. The improvement of claim 5 wherein said screen section slopes downwardly to shed objects that contact said sheet of screen material.

6. The improvement of claim 1 wherein the plane of said regenerator outlet opening is horizontal and said means for screening includes a ring of screen material that surrounds the periphery of said regenerator outlet opening and extends upwardly from the wall of the regenerator vessel wall for a distance of at least one third of the cooler diameter.

7. The improvement of claim 6 wherein said means for screening includes a cover of screen material located above the regenerator outlet opening and extending radially outward to at least said ring of screen material.

8. The improvement of claim 1 wherein said catalyst cooler comprises a backmix catalyst cooler and said regenerator outlet opening provides means for passing catalyst from said catalyst cooler to said regenerator vessel.

* * * * *